(12) United States Patent
Wallentin et al.

(10) Patent No.: US 6,188,911 B1
(45) Date of Patent: Feb. 13, 2001

(54) EFFICIENT MESSAGE TRANSMISSION IN A MOBILE COMMUNICATION SYSTEM

(75) Inventors: Bo S. P. Wallentin, Ljungsbro; Pär I. Gustavsson, Linköping; Anders V. H. Fredén, Huddinge, all of (SE)

(73) Assignee: Telefonaktiebolaget LM Ericsson (publ), Stockholm (SE)

(*) Notice: Under 35 U.S.C. 154(b), the term of this patent shall be extended for 0 days.

(21) Appl. No.: 08/925,666

(22) Filed: Sep. 9, 1997

(51) Int. Cl.[7] .................................................. H04B 7/00
(52) U.S. Cl. .................................... 455/524; 455/433
(58) Field of Search ................................ 455/412, 414, 455/422, 415, 432, 433, 435, 456, 450, 560, 38.1, 517, 524

(56) References Cited

U.S. PATENT DOCUMENTS

| | | |
|---|---|---|
| 3,831,095 | 8/1974 | Mounce . |
| 5,200,954 | 4/1993 | Teel, Jr. et al. . |
| 5,239,673 | 8/1993 | Natarajan . |
| 5,278,890 | 1/1994 | Beeson, Jr. et al. . |
| 5,436,905 | 7/1995 | Li et al. . |
| 5,539,395 | * 7/1996 | Buss et al. ............................ 455/38.1 |
| 5,570,366 | 10/1996 | Baker et al. . |
| 5,787,357 | * 7/1998 | Salin ..................................... 455/433 |
| 5,884,145 | * 3/1999 | Haartsen ............................... 455/450 |

FOREIGN PATENT DOCUMENTS

| | | |
|---|---|---|
| 0 558 041 | 9/1993 | (EP) . |
| 96/22666 | 7/1996 | (WO) . |

* cited by examiner

Primary Examiner—Reinhard J. Eisenzopf
Assistant Examiner—Sam Bhattacharya
(74) Attorney, Agent, or Firm—Nixon & Vanderhye P.C.

(57) ABSTRACT

The present invention reduces signaling between a mobile control node and one or more base stations. A common controller at each base station controls allocation of communication resources related to communications with mobile communication units. A single message is sent from the mobile control node to at least one of the base stations including information that identifies plural communication resources at the one base station, e.g., channel units corresponding to plural sector cells supported by the base station. The common controller at the one base station distributes the single message to the plural communication resources to be communicated ultimately by one of those communications resources to the mobile communication units. Signaling between a control node and plural base stations is therefore reduced by sending a single message from the control node to the base station that identifies plural communication resources at the base station rather than sending a separate message to each of the communications resources.

22 Claims, 5 Drawing Sheets

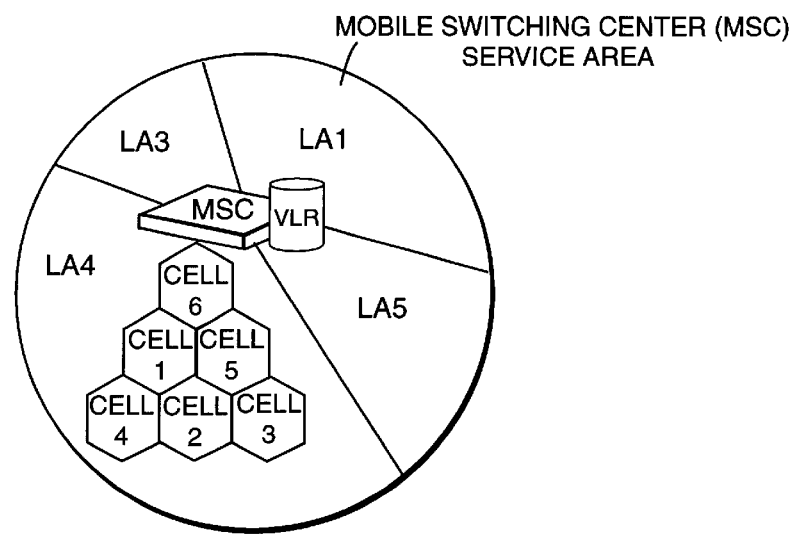
FIG. 1
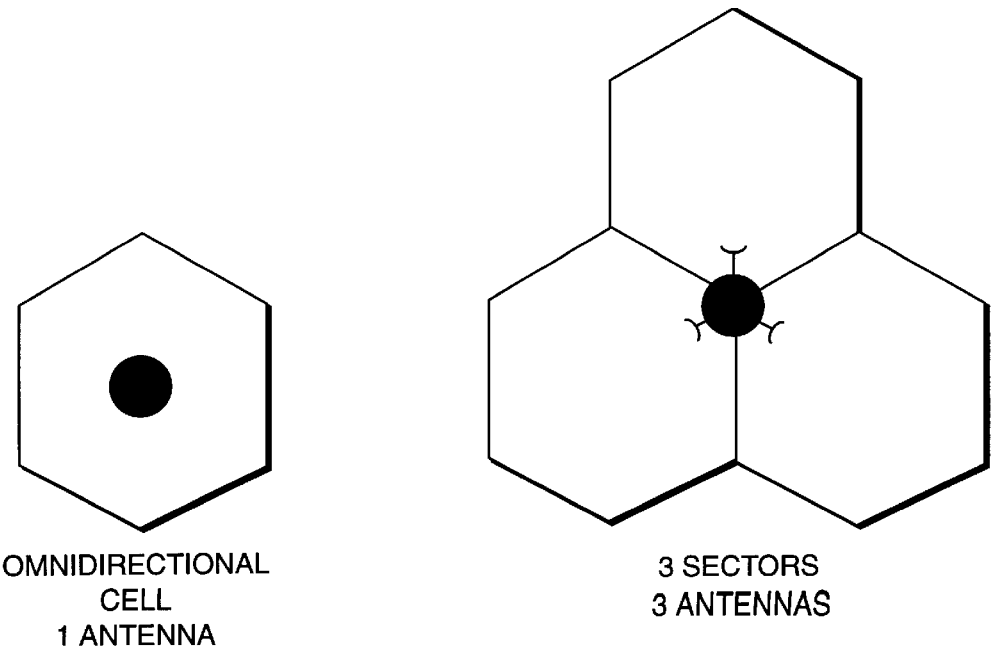
FIG. 2A
FIG. 2B

EFFICIENT MESSAGE TRANSMISSION IN A MOBILE COMMUNICATION SYSTEM

FIELD OF THE INVENTION

The present invention relates to message transmissions between nodes in a mobile telecommunications system, and in particular, to a method and apparatus for eliminating redundant or otherwise unnecessary message transmissions between the nodes.

BACKGROUND OF THE INVENTION

Mobile communications systems, such as cellular radio telephone systems, are typically realized as a network of neighboring radio cells which together provide complete coverage of the area to be serviced. Mobile radio subscribers may roam freely within the area of the system from one cell to another. One well known digital mobile radio system is the Global System for Mobile communication (GSM). Although the present invention is sometimes described using GSM terms, the present invention has wide application, and in any event, applies to any type of cellular or other mobile communications system.

Each cell is served by a base station that includes radio transceiver equipment. Plural base stations are interconnected via a switching node sometimes referred to as a mobile switching center (MSC) which also may be connected to other networks such as the public switched telephone network (PSTN).

Alternatively, several base stations may be controlled by a base station controller (BSC) connected between the base stations and an MSC. Typically, several BSCs are served by a single MSC which controls calls to and from other telephony and data communication networks. Whichever node (MSC or BSC) interconnects a group of base stations, that node controls radio-related functions such as paging, radio channel allocation, hand-over, and power control.

When a call is directed to a mobile station (MS) in the mobile communications system, that mobile station must be located and then paged before a call connection can be established. These tasks are facilitated by having idle mobile stations tuned to a base station control channel and by having the mobile stations periodically transmit registration messages over a base station control channel. As the mobile station moves from cell to cell, it retunes to the current cell's corresponding control channel.

In order to make the location and paging of subscribers efficient, cellular networks are often divided into location areas (LAs) where a location area includes a group of cells. As illustrated in FIG. 1, location area 4 (LA4) includes cells 1–6. In this example, five location areas LA1–LA5 make up a mobile switching center (MSC) service area. The MSC service area is associated with a visiting location register (VLR) database in which mobile stations currently within that service area are registered. When a call is routed to the MSC, the MSC checks the VLR to identify the current location area in which the called mobile station is registered. Thereafter, a paging message is distributed to those base stations in the identified location area and transmitted by base station transceivers within that location area.

As base station demands increase, the configuration of cells and sharing of equipment becomes more sophisticated. For example, FIG. 2A shows a single cell that employs a single omnidirectional antenna commonly used by all of the base station transceivers serving that cell. A more sophisticated configuration is shown in FIG. 2B where a single base station site serves three sectors or cells with each such sector cell having its own directional antenna. Each sector cell shares the same pool of transceiving equipment located at the base station site.

Even though the same pool of transceiving equipment is utilized for plural base station sectors, paging messages are sent from the MSC or BSC node to the base station site for each one of the sectors supported at that site. Thus, if the base station services three sectors, three separate but nevertheless identical paging messages are sent from the MSC or BSC to the base station site. This redundant message transmission creates unnecessary signaling, consumes transmission resources, and increases data processing loads. A similar problem exists for other types of control messages sent to some or all base station sectors, e.g., short messaging service (SMS) cell broadcast messages, system information messages used to inform mobile stations regarding network access procedures, etc.

It is an object of the present invention to overcome this problem and eliminate redundant or otherwise unnecessary signaling between nodes in a mobile communications system.

It is also an object of the present invention to minimize processor load associated with sending multiple messages to the same node.

It is a further object of the present invention to provide a single message from the MSC or BSC in a mobile communications system to a base station site and have the base station site transmit that message to multiple sectors supported by that site.

Yet another object of the invention is to improve the speed and performance of mobile radio paging operations.

SUMMARY OF THE INVENTION

The above problems are solved and the above objects are met by this invention. In a mobile radio communications system supporting communications with plural mobile radio units, each of several base stations includes plural radio transceivers and a common controller. The common controller assigns radio channels to ones of the transceivers. A switching controller, e.g., an MSC or BSC, is coupled to the base stations and controls communications involving the radio units. The switching controller transmits a control message, (such as a mobile station paging command, an SMS command, a system information message, etc.), to a selected one (or more) of the base stations. The control message identifies plural channels associated with the selected base station. The common controller in the selected base station distributes the control message to each of the identified channels for radio transmission.

Each channel may correspond for example to one of plural sector cells supported by the base station, e.g., a sector control channel or a sector paging channel. In other words, each sector cell shares the base station radio transceivers under the control of the common controller. Accordingly, the common controller at the base station distributes the control message, which has been transmitted and received only once, so that is transmitted over several channels, e.g., a channel assigned to each sector.

In this way, redundant control messages for each sector need not be transmitted between the switching controller (like an MSC or BSC) and the base station. If the control message is a paging message directed to a mobile radio unit located in an area supported by the base station, only that single paging message is sent from the switching controller to the base station. The paging message is then distributed by the common controller at the base station to each of the paging channels associated with each sector cell supported by the base station.

In different specific embodiments of the present invention, the single control message received by each selected base station from the switch controller indicates that the control message is to be multicast over several channels associated with the selected base station or is to be broadcast over all channels of a specific type associated with the selected base station.

The method of the present invention therefore reduces signaling between a control node and plural base stations by sending a single message from the control node to at least one of the base stations including information that identifies plural communication resources at the one base station rather than separately sending the message to each of the communications resources.

BRIEF DESCRIPTION OF THE DRAWINGS

These and other objects. advantages, and features of the invention will be more fully understood by reading the following detailed description in conjunction with the drawings in which like reference numerals refer to like elements throughout and in which:

FIG. 1 is a diagram of a mobile switching center service area covering several location areas;

FIGS. 2A and 2B show single antenna and sectored antenna cell configurations, respectively;

DETAILED DESCRIPTION

In the following description, for purposes of explanation and not limitation, specific details are set forth, such as particular embodiments, signaling implementations, , interfaces, techniques, etc. in order to provide a thorough understanding of the present invention. However, it will be apparent to one skilled in the art that the present invention may be practiced in other embodiments and applications (including applications other than cellular telephony) that depart from these specific details For example, while the present invention is described in the context of an example cellular telephone network using GSM terminology, those skilled in the art will appreciate that such terminology is illustrative and in no way limiting and that the present invention may be implemented in any cellular telephone system. In other instances, detailed descriptions of well-known methods, interfaces, devices, and signaling techniques are omitted so as not to obscure the description of the present invention with unnecessary detail.

Figure 3:
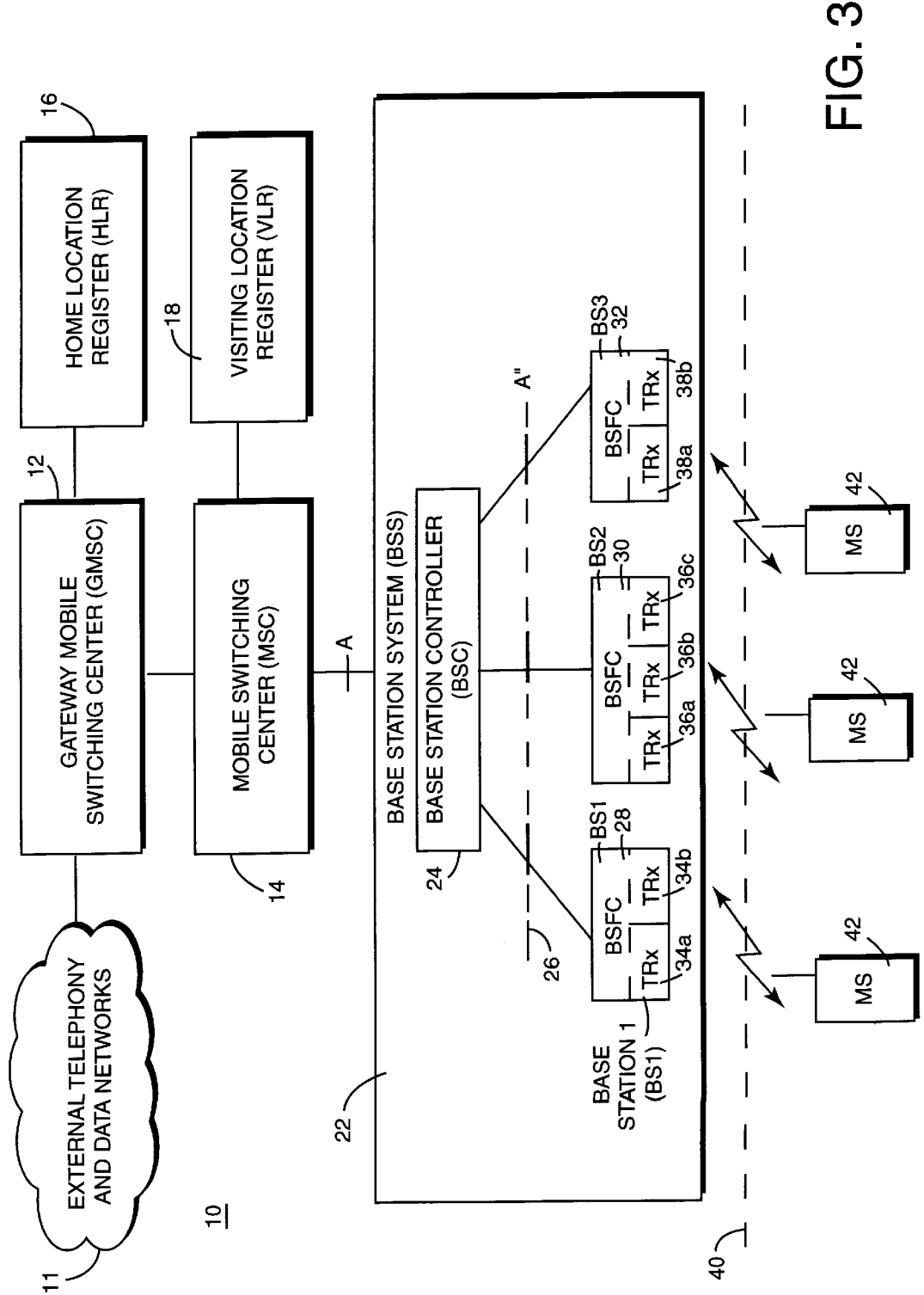
FIG. 3 is a function block diagram of a mobile communications system in which the present invention may be advantageously applied.

FIG. 3 illustrates a mobile communications system 10 which is one example environment where the present invention may be advantageously implemented. Mobile communications system 10 includes a gateway mobile switching center (GMSC) 12 which interfaces with other external telephony and data communication systems 11 such as the PSTN, ISDN, PSDN, etc. As described above, the GMSC 12 is the point in the mobile communications system 10 where calls to mobile stations (MS) 42 enter, and therefore, each mobile terminating call must be routed by the GMSC 12 to the appropriate MSC for delivery to the called mobile station. In FIG. 3, a single MSC 14 is shown for purposes of illustration; of course, additional MSCs may also be employed.

To perform the initial routing functions, the GMSC 12 analyzes the incoming mobile call and extracts a mobile station identification number, e.g., a mobile station ISDN (MSISDN) number, to identify the home location register (HLR) where the mobile station is registered The HLR stores location information for each mobile subscriber unit and also contains a list of both basic and any supplementary services which a mobile subscriber is authorized to use along with a current subscriber location number corresponding to a visiting location register (VLR) address. The MSC 12 queries the HLR 16 for information about how to route the call to the mobile switching center service area currently serving that mobile station. Using the service area information accessed from the HLR 16, the call is routed to the appropriate serving MSC 14 which is associated with a visiting location register (VLR) 18. The VLR 18 includes a database containing information about all mobile stations currently located in the associated service area. In particular, the VLR 18 contains temporary subscriber information needed by the MSC 14 to provide services to visiting/roaming mobile subscribers. When a mobile station roams into a new MSC service area, the associated VLR 18 requests data about the mobile station from the HLR 16 and stores it. Thus, if the roaming mobile station makes a call, the VLR 18 already has the information needed for call set-up.

As the serving MSC/VLR pair, the MSC 14 and VLR 18 know, as a result of the regular mobile station registration procedures, the particular location area (LA) in the MSC service area where the called mobile station is located. The MSC 14 then sends a single paging message to a base station subsystem 22 over an "A" interface identified by reference numeral 20 to a base station system (BSS) 22 which includes a base station controller (BSC) 24 coupled to multiple base stations (BSS) 28, 30, and 32. Communications between the base station controller 24 and the base stations 28, 30, and 32 are by way of an "A"" interface identified at reference numeral 26.

Although not necessary to implement the present invention, in the illustrative embodiment, the base station system 22 performs or supervises the radio-based functions in the mobile communications system and therefore manages radio communications with mobile stations by setting up calls, taking down calls, orchestrating hand-over of calls in progress between cells, etc. In handling mobile station connections during call set-up, the BSC 24 sends paging messages to the base stations within the identified location area. The base station then transmits the paging message via the air interface 40 over a control channel or a paging subchannel incorporated in the control channel When the called mobile station detects the paging message, it sends an acknowledgment over the base station's control channel, a traffic channel is assigned, the mobile station rings, and a call connection is established if the mobile subscriber answers.

The representative base stations BS1, BS2, and BS3 in base station system 22 each include a common base station functional controller (BSFC) (sometimes referred to simply as "common controller") that controls a collection of representative transceivers (TRX) 34a and 34b, 36a–36c, 38a, and 38b, respectively. As mentioned in the background section, the base station function controller (BSFC) and transceiver equipment are located at a single base station site but service multiple sector or sector cells, with each sector having its own antenna but sharing the common controller and transceiver equipment. For example, the three base station sites in FIG. 3 may each service three or six sectors.

Each sector cell is typically allocated some portion of the shared communication resources provided by the base station. Such communication resources include for example control channels, paging channels, broadcast channels, traffic channels, some portion of the BSFC 24 data processing overhead, etc. Significantly, when a paging or other type of control message is to be communicated to plural base stations and plural sector cells, the MSC 14 merely transmits a single paging or other control message to the base station controller 24. The base station controller 24 transmits a single paging or other control message to the base station function controller at each base station in the identified location area currently serving the called local station 42. The base station function controller then distributes the paging or other control message for transmission over the paging or other channel associated with each sector cell supported by each base station.

Figure 4:
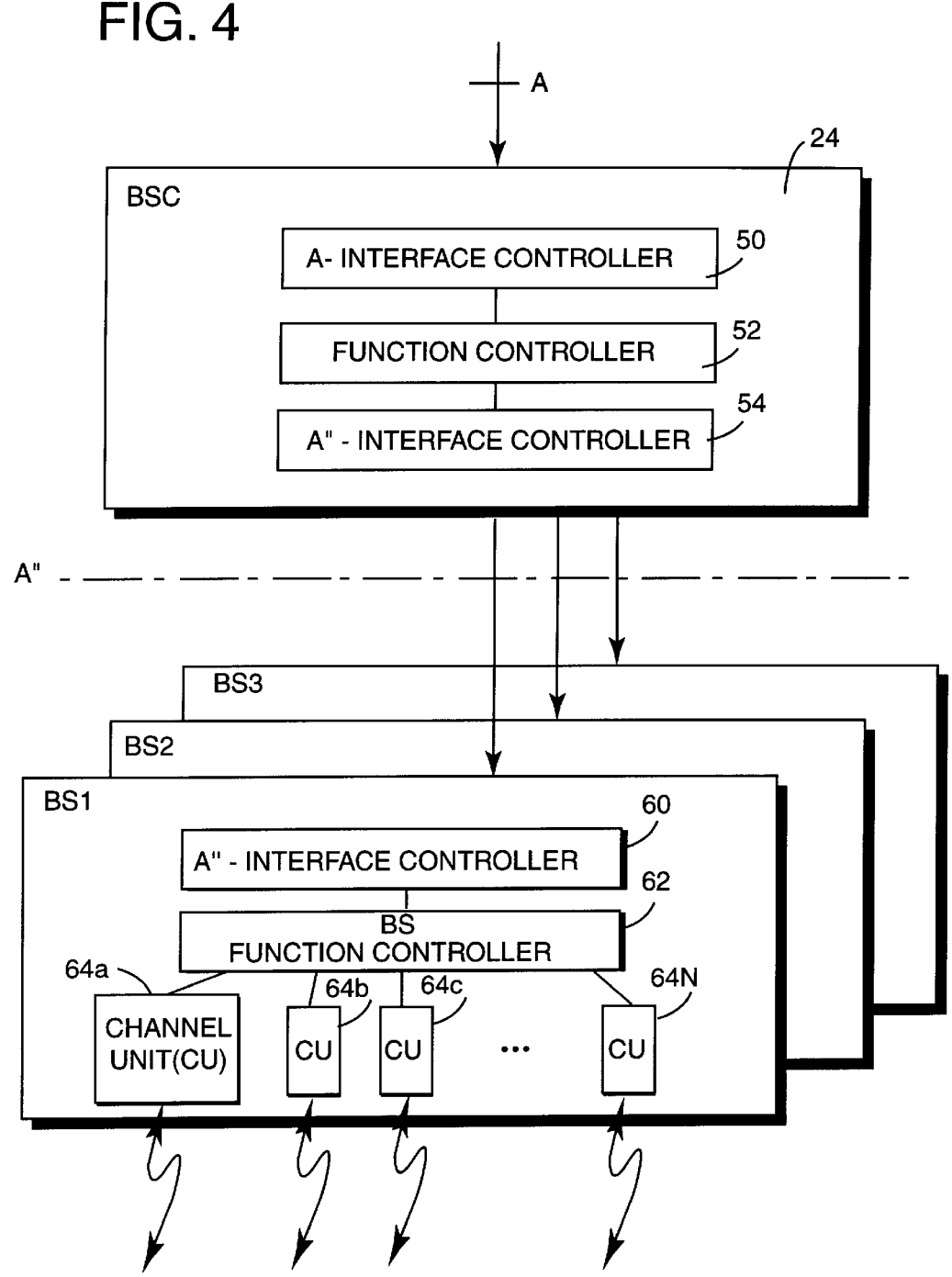
FIG. 4 is a function block diagram illustrating in further detail the base station controller and a base station in accordance with the system depicted in FIG. 3.

More specifically and referring to the function block diagram shown in FIG. 4 and using the example of a paging command, the base station controller 24 receives the paging command at an A interface controller 50 and provides it to a BSC function controller 52. The function controller 52 performs a variety of functions, some of which were described above. One of those functions is to analyze the paging command to determine which location area and/or list of cells are identified in the paging command. The BSC function controller 52 then forwards the paging message via the A" interface controller 54 over the A" interface to each base station in the designated location area or serving one of the identified sector cells. Each base station includes an A" interface controller 60, a base station function controller 62, and multiple radio transceiver channel units (CUs) 64a, 64b, 64c, . . . 64n. The term channel or channel unit encompasses any type of radio channel, e.g., a frequency in FDMA systems, one or more time slots in TDMA systems, a chip code in a CDMA system, etc.

Each selected base station function controller 62 decides which channel units should transmit the paging command. Some of the channel units, such as traffic channel units, are shared in the sense that they may be assigned temporarily to any one of the sector cells supported by the base station. However, one or more of the channel units may be configured as a control, paging, or broadcast channel unit for each of the sector cells. In other words, each sector cell includes its own control, paging, or broadcast channel. Each of the controllers 50, 52, 54, 60, and 64 may be implemented using software, hardware, or both.

Figure 5:
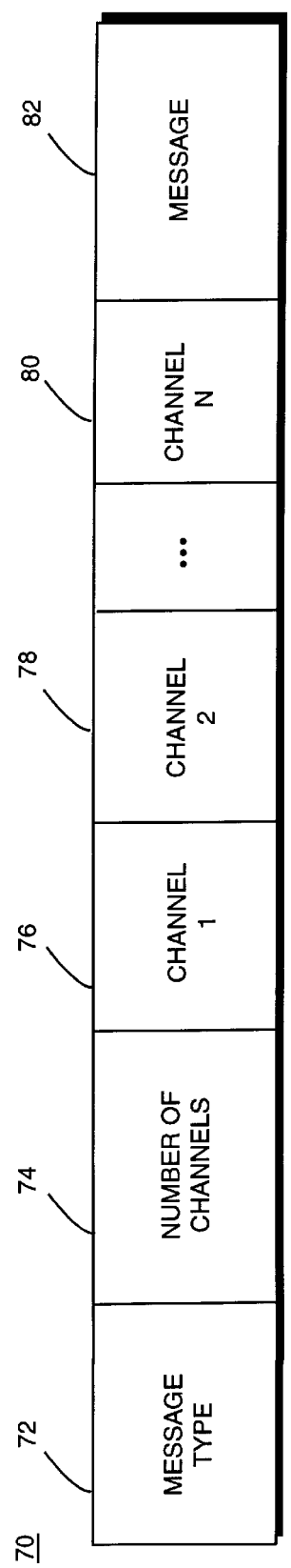
FIG. 5 shows a multicast message format in accordance with one example embodiment of the present invention.

The paging (or other) control message may be transmitted from the base station controller 24 over the A" interface to each of the base stations in any format that specifies in some fashion to which channels the control message is to be distributed. Two example formats are described in conjunction with FIGS. 5 and 6. FIG. 5 illustrates a multicast message format 70. The multicast message format includes a message type field 72, a number of channels field 74, a list of sector channels 76, 78, and 80, and a message field 82. The message type may be for example a paging command or an SMS message. The number of channels 74 indicates the number of channel units which are to transmit that type of message, while each listed sector channel might identify a control, paging, or broadcast channel for each sector cell.

Figure 6:
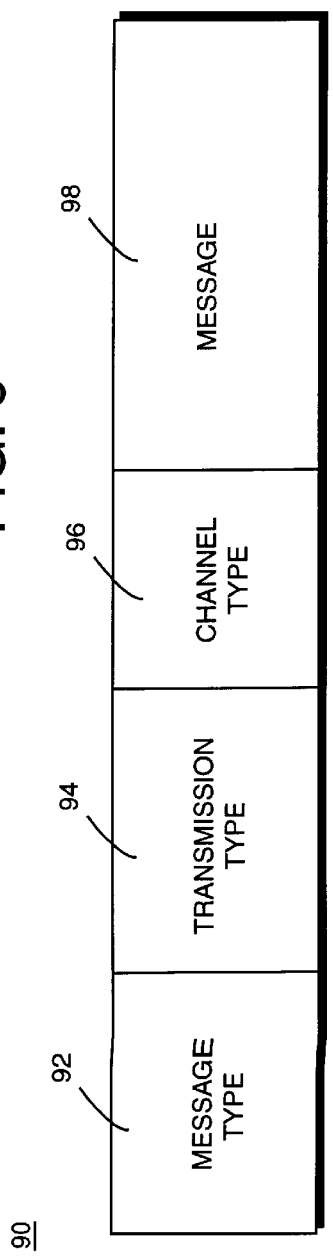
FIG. 6 shows a broadcast message format in accordance with one example embodiment of the present invention.

FIG. 6 shows a broadcast format message 90. Field 92 includes a message type such as a paging command. Field 94 conveys a transmission type that indicates for example the message in field 98 is to be broadcast to all channel units. Field 96 may be employed to qualify the type of channels, e.g., all paging channels, rather than all possible channel units.

Figure 7:
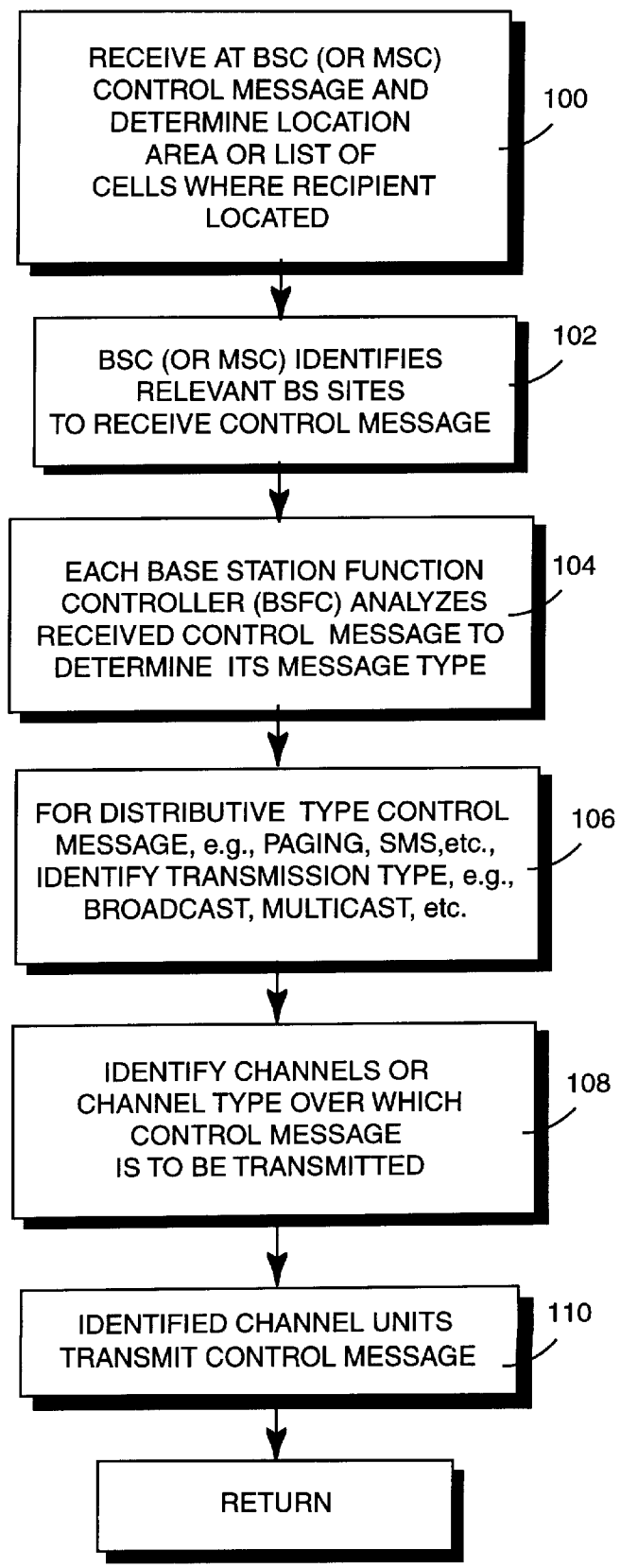
FIG. 7 is a flowchart diagram illustrating example procedures for implementing a method in accordance with one example embodiment of the present invention.

An example method in accordance with the present invention is now disclosed in conjunction with the flowchart shown in FIG. 7. Initially, the BSC (or MSC) receives a control message (such as a paging command) and determines the location or list of cells where a recipient(s) of that control message is (are) located (block 100). The BSC (or MSC) then identifies from that location area or list of cells the relevant base station sites to receive that control message (block 102). Of the identified base stations, each base station function controller (BSSC) analyzes the received control message to determine its message type, e.g., paging, short message command, etc. (block 104). The transmission type is also identified to determine its transmission type, e.g., broadcast, multicast, etc. (block 106). Then the channels or channel type over which the control message is to be transmitted is identified (block 108). The identified channel units then transmit the control message (block 110).

Thus, by sending only one control message to each base station which is then ultimately provided to each sector cell supported by the base station, the present invention significantly lowers the signaling load on the MSC/BSC-base station interface. As a result, the present invention also reduces the data processing load in the MSC/BSC as well as at the individual base stations because of this lower signaling load. In a paging context, the present invention improves the efficiency and overall performance of mobile paging operations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the illustrative embodiment was often described in terms of paging and SMS control messages, the invention applies to any type of message ultimately distributed over more than one channel supported by a base station.

What is claimed is:

1. A communications system for communicating with mobile radio units comprising:

plural base stations, each base station including plural radio transceivers and a common controller assigning radio channels to ones of the radio transceivers; and a control node coupled to the base stations and controlling communications involving the mobile radio units, wherein the control node transmits a message to a base station, the message identifying a first set of plural radio channels that may include less than a total number of radio channels associated with the base station and includes a message type field and a multicasting transmission type field, and wherein the common controller in the base station selectively distributes the message for transmission only over each of the identified plural radio channels in the first set.

2. The communications system in claim 1, wherein the control node is a mobile switching controller (MSC).

3. The communications system in claim 1, wherein the control node is a base station switching controller (BSC) that interfaces with other communications systems through a mobile switching center.

4. A communications system for communicating with mobile radio units comprising:

plural base stations, each base station including plural radio transceivers and a common controller assigning radio channels to ones of the radio transceivers; and a control node coupled to the base stations and controlling communications involving the mobile radio units, wherein the control node transmits a message to a base station, the message identifying a first set of plural radio channels that may include less than a total number of radio channels associated with the base station and includes a messaging type field and an identification of a selected number of sectors, wherein the common controller in the base station selectively distributes the message for transmission only over each of the identified plural radio channels in the first set, wherein the base station services plural sectors having corresponding sector antennas, each sector sharing the plural radio transceivers and being controlled by the common controller, and wherein the common controller causes the message to be transmitted over a radio channel assigned to each selected sector.

5. A communications system for communicating with mobile radio units comprising:

plural base stations, each base station including plural radio transceivers and a common controller assigning radio channels to ones of the radio transceivers; and a control node coupled to the base stations and controlling communications involving the mobile radio units, wherein the control node transmits a message to a base station, the message identifying a first set of plural radio channels that may include less than a total number of radio channels associated with the base station and includes a messaging type field and an identification of a selected number of cells, wherein the common controller in the base station selectively distributes the message for transmission only over each of the identified plural radio channels in the first set, wherein the selected base station services plural cells having corresponding cell antennas, each cell sharing the plural radio transceivers and being controlled by the common controller, and wherein the common controller causes the message to be transmitted over a radio channel assigned to each selected cell.

6. The communications system in claim 1, wherein the message is a paging message directed to one of the mobile radio units with only that paging message being sent from the control node to the selected base station, and wherein the paging message is distributed by the common controller to each of the identified channels in the first set.

7. The communications system in claim 1, wherein the message is a short message provided by a short messaging service to be distributed to multiple mobile radio units.

8. The communications system in claim 1, wherein the message is a system information message to be distributed to multiple mobile radio units.

9. A communications system for communicating with mobile radio units comprising:

plural base stations, each base station including plural radio transceivers and a common controller coordinating channel assignments with ones of the transceivers;

at least one of the base stations including plural sector cells having corresponding sector cell antennas, the common controller of the one base station assigning a control channel for each sector cell to one of the base station's transceivers;

a switching controller coupled to the base stations and controlling handling of communications involving the mobile communications units, wherein the switching controller transmits a single paging command to selected base stations including the one base station, the single paging command identifying control channels associated with a selected number of sector cells of the one base station, wherein the selected number may be less than a total number of sector cells of the one base station, and wherein the single paging command includes a message type field and an identification of the selected number of sector cell channels.

10. The communications system in claim 9, wherein the common controller in each of the selected base stations distributes the single message to each of the identified channels associated with that selected base station.

11. The communications system in claim 9, wherein the single paging command includes information regarding all channels associated with a selected base station on which a paging message is to be sent.

12. A communications system for communicating with mobile radio units comprising:

plural base stations, each base station including plural radio transceivers and a common controller coordinating channel assignments with ones of the transceivers;

at least one of the base stations including plural sector cells having corresponding sector cell antennas, the common controller of the one base station assigning a control channel for each sector cell to one of the base station's transceivers;

a switching controller coupled to the base stations and controlling handling of communications involving the mobile communications units, wherein the switching controller transmits a single paging command to selected base stations including the one base station, the single paging command identifying control channels associated with a selected number of sector cells of the one base station, wherein the selected number may be less than a total number of sector cells of the one base station, wherein the single paging command includes a message type field and a multicasting transmission type field.

13. The communications system in claim 9, wherein the switching controller is a mobile switching controller (MSC).

14. The communications system in claim 9, wherein the switching controller is a base station switching controller (BSC) that interfaces with other communications systems through a mobile switching controller (MSC).

15. In a mobile communications network, a method of reducing signaling between a network control node and plural base stations comprising the steps of:

establishing a common controller for each base station that controls allocation of communication resources associated with radio communications with mobile communication units;

sending a message including a message type filed and a multicasting transmission type field from the network control node to at least one of the base stations including information that identifies plural communication resources at the one base station;

multicasting the message to only selected ones of the plural communication resources at the one base station; and transmitting the multicast message using the selected communications resources.

16. The method in claim 15, wherein the communication resources include communications channels.

17. The method in claim 16, wherein each communications channel corresponds to a type of channel.

18. The method in claim 17, wherein the channel type is a paging channel.

19. The method in claim 17, wherein the channel type is a short message service broadcast channel.

20. The method in claim 15, wherein the message is a paging command.

21. The method in claim 15, wherein the base station includes a plurality of transceivers, each transceiver supporting one or more communications resources, and wherein one of the communication resources employs plural ones of the transceivers.

22. The method in claim 15, wherein the base station includes transceiving equipment shared by plural sectors supported by the base station, each sector including a corresponding sector antenna and being assigned one of the plural communication resources such that the message is communicated to mobile communication units monitoring communication resources in each of the plural sectors.

* * * * *